July 12, 1966 W. O. BORCHERDT 3,260,496
THERMAL RESPONSIVE HIGH PRESSURE BUTTERFLY VALVE SEAL MEANS
Original Filed July 25, 1961 3 Sheets-Sheet 1
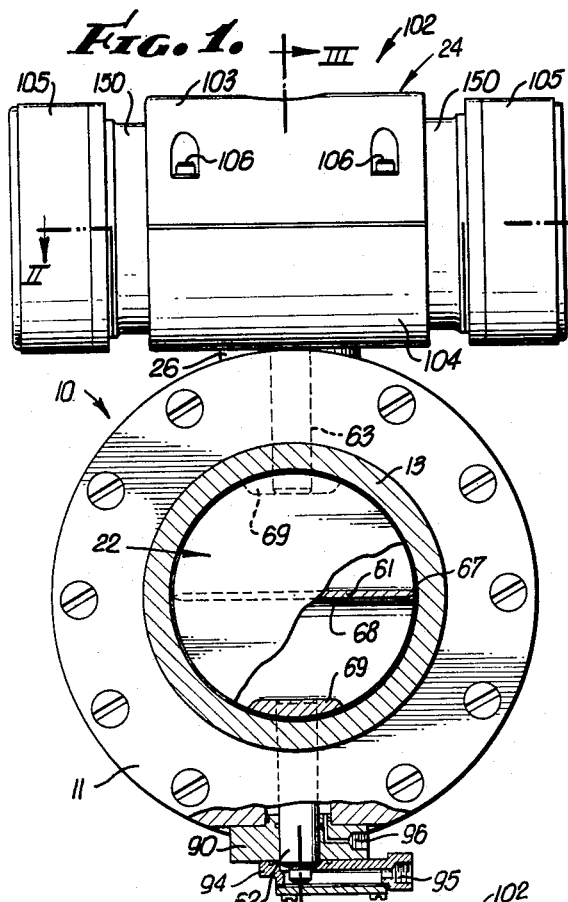
INVENTOR.
WALTER O. BORCHERDT
BY Miketta & Glenny
ATTORNEYS.

July 12, 1966 W. O. BORCHERDT 3,260,496
THERMAL RESPONSIVE HIGH PRESSURE BUTTERFLY VALVE SEAL MEANS
Original Filed July 25, 1961 3 Sheets-Sheet 2
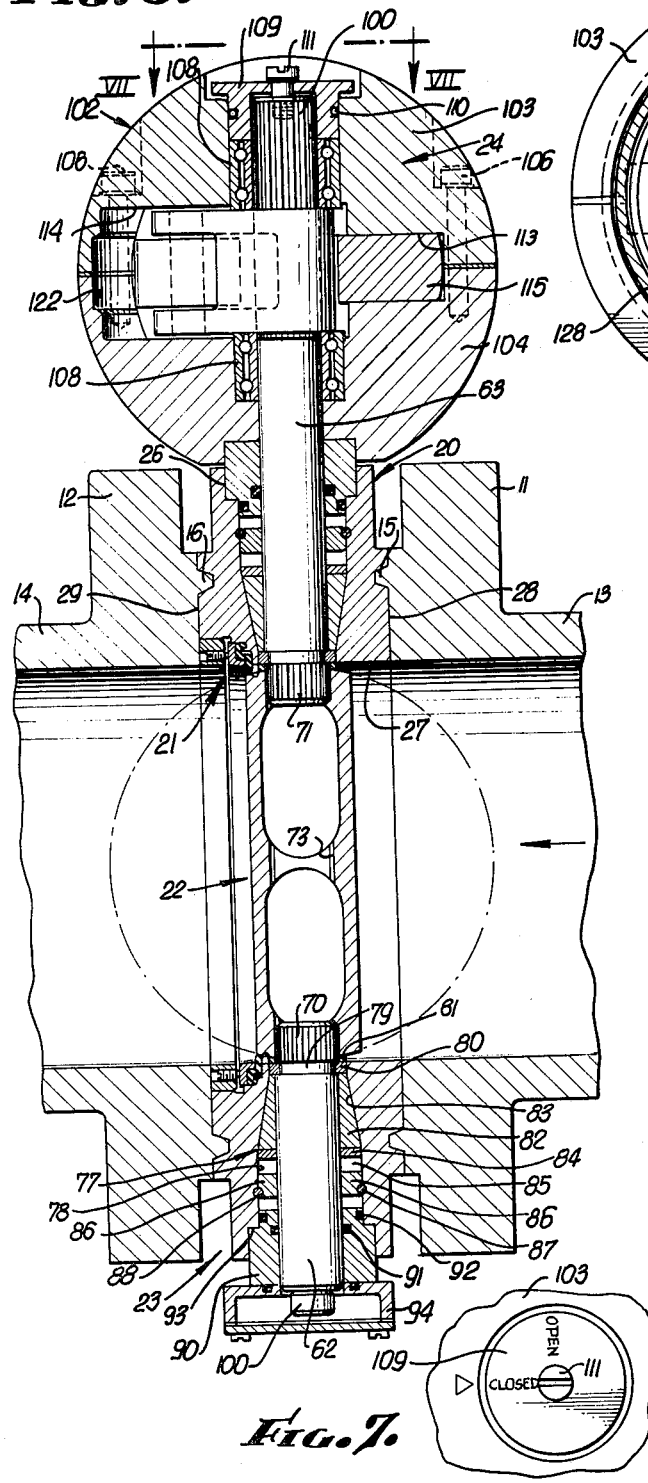
FIG. 3.
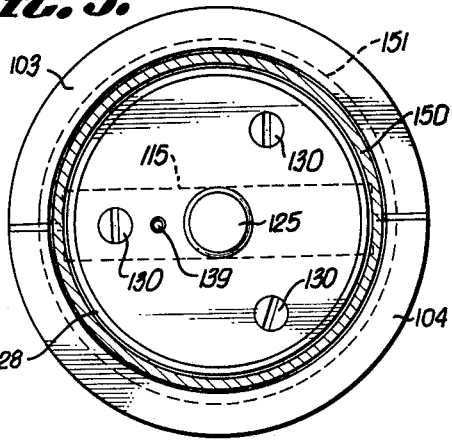
FIG. 5.
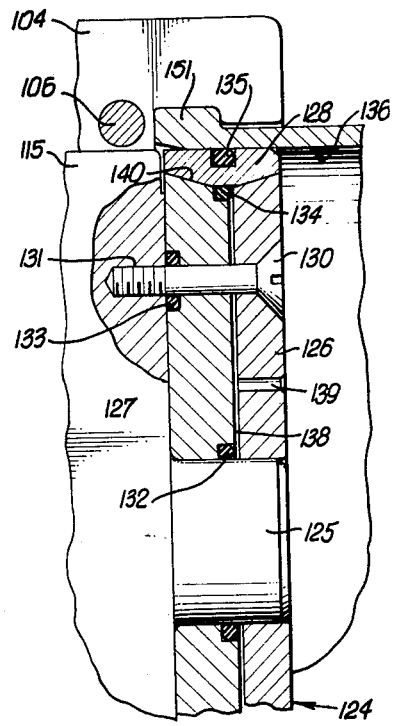
FIG. 6.
FIG. 7.
INVENTOR.
WALTER O. BORCHERDT
BY Miketta & Glenny
ATTORNEYS.

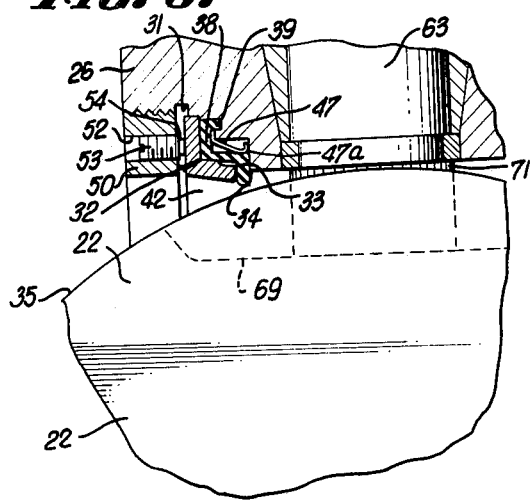
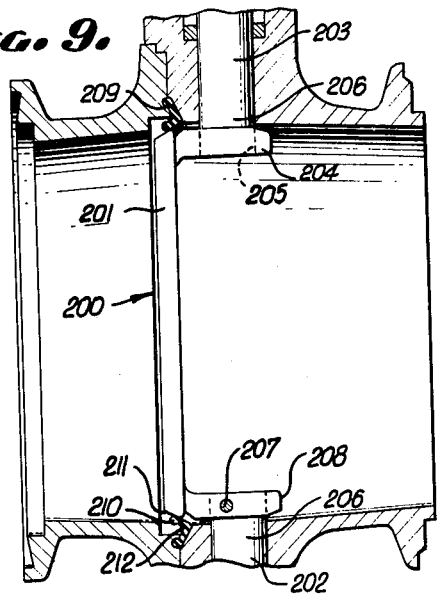
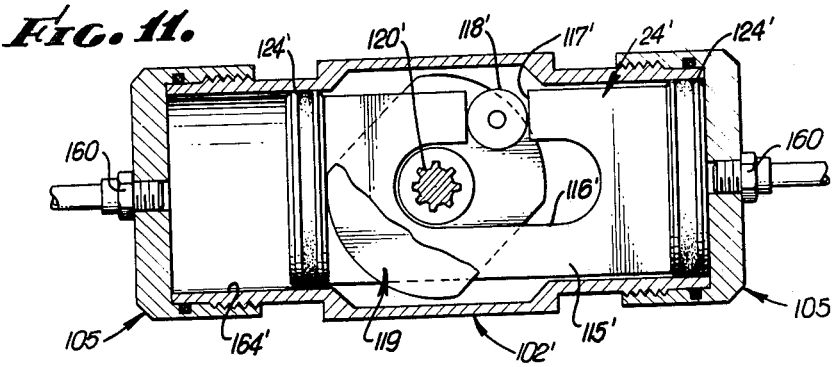
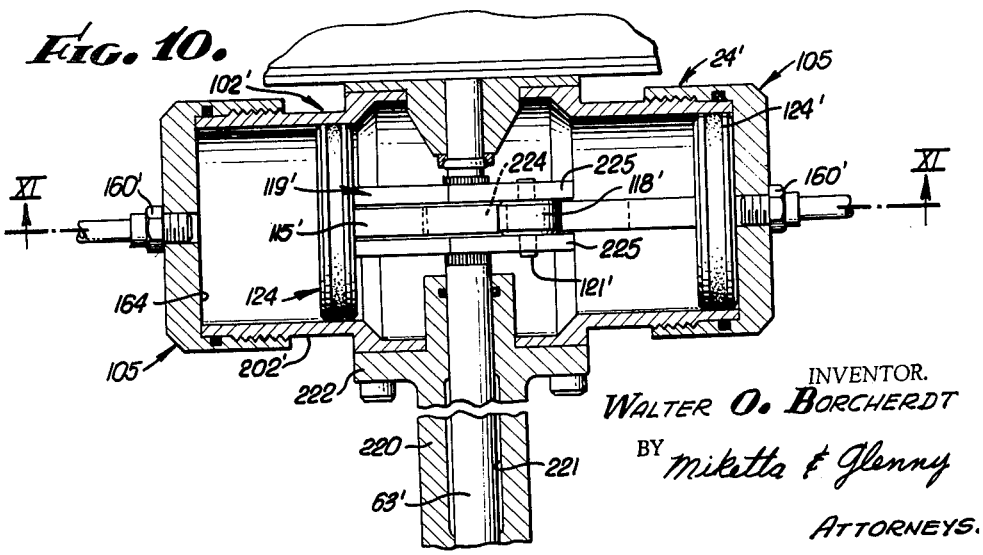

United States Patent Office 3,260,496
Patented July 12, 1966

3,260,496
THERMAL RESPONSIVE HIGH PRESSURE
BUTTERFLY VALVE SEAL MEANS
Walter O. Borcherdt, Mountain Lakes, N.J., assignor to
B. H. Hadley, Inc., Pomona, Calif., a corporation of
California
Original application July 25, 1961, Ser. No. 126,695.
Divided and this application Sept. 16, 1963, Ser.
No. 309,074
9 Claims. (Cl. 251—171)

This invention relates to a valve means and more particularly to a valve means of butterfly type embodying a novel construction and mode of operation particularly adaptable for very low temperature fluids known as cryogenic fluids. This application is a divisional application of copending application Serial No. 126,695, filed July 25, 1961, now abandoned.

In general, prior proposed butterfly valve devices have included valve discs pivotally mounted on a disc shaft and arranged in skew relation to a fluid passageway in the valve body. Such skew relation of the valve disc requires special machining of internal surfaces of the valve body in order to provide an effective tight seal. Under conditions of high pressure, the disc shaft was required to be of relatively heavy section in order to withstand such pressures. Since prior proposed disc shafts extended across the fluid passageway they were subject to bending stresses. Bearing mountings for such through-disc shafts were likewise specially constructed to withstand bearing stresses caused by such loading of the disc shaft in the fluid passageway, all of which tended to cause non-uniform deflection and relatively rapid bearing wear.

Such prior proposed valve devices having valve discs arranged in skew relation usually included sealing means at the periphery of the valve disc wherein the sealing means were carried by the valve body. In other types of butterfly valve devices where the valve disc was arranged perpendicular to the fluid passageway or in non-skew relation sealing means of prior proposed valve discs were usually carried on the peripheral edge of the valve disc. Tight effective seals were difficult to achieve under conditions of high fluid pressure. In some instances such non-skew valve discs included peripheral sealing means which were cooperable with sealing means provided on the valve body. Such sealing means on the valve body required special machining because it will be understood that the valve disc is rotated about a diameter and one-half of the valve disc is moved upstream while the other half is moved downstream.

The requirement of a zero leakage valve means of butterfly type capable of operating under high fluid pressures and variable fluid temperature conditions were previously met by prior proposed valves by employing relatively complicated valve sealing means as mentioned above which were expensive, required precision machining of the valve body and were not generally suitable or easily and readily operable when low temperature fluids were held by such prior proposed valve devices.

The present invention contemplates a fluid control valve means particularly designed and adapted for use with cryogenic fluids. The present valve construction, while particularly designed for such fluids, is readily adaptable to and capable of utilization with fluids at normal temperatures or high temperatures. Cryogenic fluids include those having temperatures which may extend down to and sometimes below minus 450° F., such fluids including liquid nitrogen, liquid hydrogen, liquid helium and liquid oxygen, and the like. The present invention contemplates a butterfly type valve means which is adapted to be useful in storage of such fluids and is movable from closed zero leakage sealed position to an open position wherein substantially full flow of fluid is provided.

The present invention contemplates a valve means of butterfly type wherein a valve body of relatively narrow annular form defines a fluid passageway, the valve body carrying diametrically disposed stub shafts. A valve member is positioned in said passageway and connected to said stub shafts. The axis of the valve member is offset with respect to the axis of the stub shafts and the valve member is provided with a peripheral edge face spaced from the axis of the valve member. Seal means provided on the valve body engages in sealing relation the peripheral edge face on the valve member in valve closed position. In valve open position the spacing of the axes of the valve member and the shaft axis is so arranged that upon rotation of the valve member through 90° the seal means is wholly released from its contact with the peripheral edge face of the valve member and is free from any contact with the valve member. The present invention contemplates a novel seal means construction and a novel construction of the valve member whereby the valve member may constitute a beam or girder and thereby resist high pressures without imposing severe bending stresses on the valve member or on the stub shafts. The valve means of the present invention also contemplates novel bearing means for mounting stub shafts to provide an effective seal. Actuating means for the valve member includes a novel arrangement for turning an extension on one of the stub shafts in order to actuate the valve member.

It is therefore one of the primary objects of the present invention to provide a butterfly type valve means particularly adapted for use with cryogenic fluids and embodying a novel valve construction adapted for use with other fluids as well.

An object of the present invention is to disclose and provide a butterfly type valve means employing a valve member disposed in non-skew relation to the fluid passageway and constructed as a beam or girder of uniform thickness.

Another object of the invention is to disclose and provide a butterfly type valve construction wherein the valve member is arranged in non-skew relation to the fluid passageway and wherein seal means are carried by the valve body for sealing engagement with the valve member in valve closed position and free from contact with the valve member in valve open position.

Still another object of the present invention is to disclose a sealing means adapted to be carried by a valve body for engagement with a butterfly type valve member wherein the sealing means is readily accessible for replacement and for selective adjustment of pressure about the periphery of the seal means.

A further object of the invention is to disclose and provide a butterfly type valve means including actuating means for turning a valve member and wherein the actuating means includes a simple effective cam arrangement for turning a shaft connected to the valve member.

A still further object of the invention is to disclose and provide an actuator means as mentioned above wherein a double-headed fluid pressure means is used and dampening means are provided for cushioning and retarding movement of a piston head at the end of its stroke.

A still further object of the invention is to disclose and provide a butterfly type valve means employing stub shafts for pivotally mounting a butterfly valve member and wherein bearing means of novel structure mount said stub shafts.

These and many other objects and advantages of the present invention will be readily apparent from the following description of the drawings in which exemplary embodiments of the invention are shown.

In the drawings:

FIG. 1 is an elevational view of a valve means embodying the present invention, the elevation being partly in section and being taken in a plane transverse to the fluid passageway.

FIG. 2 is a transverse horizontal sectional view taken in the plane indicated by line II—II of FIG. 1.

FIG. 3 is a vertical sectional view taken in the plane indicated by line III—III of FIG. 1.

FIG. 4 is an enlarged fragmentary sectional view taken in the same plane as that of FIG. 3 and showing the seal means of this invention.

FIG. 5 is a transverse sectional view taken in the plane indicated by line V—V of FIG. 2.

FIG. 6 is an enlarged fragmentary vertical sectional view taken in a plane passing through and along the diameter of the fluid pressure cylinder actuating means and showing the construction of a piston head.

FIG. 7 is a fragmentary top plan view taken from the horizontal plane indicated by line VII—VII of FIG. 3.

FIG. 8 is a fragmentary enlarged sectional view showing the seal means and valve member in valve open position.

FIG. 9 is a fragmentary sectional view taken in a plane similar to the plane of FIG. 4 and showing a modification of the valve member.

FIG. 10 is a fragmentary side elevation partly in section of a modified valve actuating means.

FIG. 11 is a horizontal sectional view taken in the plane indicated by the line XI—XI of FIG. 10.

One example of a fluid control valve means of butterfly type embodying this invention is generally indicated at 10 (FIG. 1). The valve means 10 may comprise a compact, narrow or thin assembly adapted to be employed between flanged opposed ends 11 and 12 of conduit or pipe 13 and 14 respectively adapted to conduct fluids of various characteristics. The flanged ends 11 and 12 may be provided with suitably configured faces as at 15 and 16 respectively for providing a fluid-tight sealed connection between the flanged pipe ends 11 and 12 and the valve means 10. The fluid conducted in the pipes 13 and 14 may be gas or liquid under high or low pressures and at various temperature ranges. The construction and arrangement of valve means 10 is particularly adapted for use with fluids of cryogenic type, such as liquid hydrogen, liquid nitrogen, and the like, having temperature ranges extending down to and in the range of minus (—) 450° F.

The valve means 10 may generally comprise a valve body 20, a seal means 21 carried by the body on the downstream side thereof (exemplary only), a valve member 22 having a construction designed for strength to withstand high pressures while providing maximum flow area when in open position, pivotal mounting means 23 carried by the valve body for the valve member and actuator means 24 cooperably connected with the pivotal mounting means for opening and closing the valve member. In the example, the valve means is designed for open and shut operation; controlling or modulating flow of fluid may be accomplished by the valve means if desired when used with fluids at normal temperature ranges and where pressure drop across the valve means is not considered critical.

The valve body 20 may comprise an annulus or annular member 26 having an external diameter approximately the same as the external diameter of the flanged ends 11 and 12, and having an internal diameter forming a passageway 27 approximately the same as the internal diameter of the pipes 13 and 14. Fluid may flow through passageway 27 in the direction as indicated in FIG. 3. Oppositely directed faces 28 and 29 of member 26 may be configured to facilitate sealing of the joints at 15 and 16 with the flanged ends 11 and 12. It should be noted that the member 26 is relatively thin, that is, its dimension in an axial direction is substantially less than its internal diameter. Member 26 may be made of any suitable metal material depending upon the characteristics of the fluid with which it is to be used; for cryogenic fluids the member may be made of stainless steel or the like.

Seal means 21 is carried by member 26 at one end of passageway 27 within an annular enlarged recess 31 of selected configuration and extending from the back face 29 of member 26. The seal means 21 may comprise an annular sealing member or ring 32 having a radially inwardly extending sealing lip 33 for sealing contact in valve closed position as at 34 with a curved peripheral edge face 35 on the valve member 22 as more particularly described hereafter. The sealing lip 33 extends from a stepped or reduced recess 36 formed in the annular member 26. The sealing element 32 includes a central cylindrical support portion 37 disposed circumaxially with respect to the axis of the seal means, said support portion 37 being integral with said lip 33 and with a radially outwardly extending holding or securement portion 38 provided with an axially directed annular rib 39 received within an annular groove 40 for holding and retaining the sealing ring 32 in the recess 36 on the valve body 20. The holding portion 38 and rib 39 is covered and retained by a generally L-section retaining or backing member 42, a radially extending leg 43 of the member 42 serving to support and back the holding portion 38 of the seal ring, while the generally axially extending leg 44 serves to underlie the cylindrical support portion 37 and to define an annular space between edge face 45 on leg 44 and the opposed surface on the member 26 and through which the sealing lip 33 extends. Edge face 45 limits displacement of the sealing lip 33 in an axial or downstream direction, while leg 44 limits radial inward displacement of the lip 33.

The sealing means 21 also includes an annular metal spring 47 which may be held between the holding portion 38 and an annular rib defined by annular groove 40, said spring 47 having a radially inwardly and axially extending portion 47a bearing against sealing lip 33 at its radially outermost surface. The spring 47 thus tends to bias the sealing lip 33 radially inwardly, and movement of the sealing lip in an axial direction is limited and restrained by the opposed surfaces of the valve annular member 26 and the edge face 45 of backing member 42.

The backing member 42 may be held in assembly with the sealing element 32 and under selected adjustable circumferential pressure by means of a pressure or retainer metal ring 50, said pressure ring 50 having a threaded connection with an annular member 26 as at 51 and being provided with a plurality of threaded circumferentially spaced bores 52 in which a plurality of pressure set screws 53 may be threadedly adjusted. Each set screw 53 may have pressure contact as at 54 with the back face of the backing member 42.

It will be readily apparent that uniform pressure may be applied to the backing member 42 by pressure screws 53 or pressure may be somewhat varied at particular locations along the member 42 so that irregularities in metal surfaces, non-uniform sealing contact of sealing lip 33 with the edge face 45, or locations where complete sealing has not been effected may be subjected to variable additional pressure in order to provide a zero leakage condition. In this respect, it should be noted from FIG. 4 that the backing member is provided a seat at 56 in a slightly indented annular shoulder radially outwardly of the groove 40. Since the pressure screws 53 contact the back face 54 of the backing member radially inwardly of seat 56, pressure or moment forces may be imparted to selected locations along the backing member which act to confine the sealing lip 33 between the edge face 45 and the opposed face of the valve body annular member. Thus movement of the sealing lip in an axial direction is further restrained and translated, because of the resilient material of the sealing lip, into a radial direction for tighter sealing contact with the edge face 35 of the valve member.

In this example, the valve member 22 is constructed for holding high pressure fluids when the valve member is in closed position. Valve member 22 may comprise a pair of spaced parallel circular walls 60 of selected thickness interconnected by a central diametrically disposed web 61 lying generally perpendicular to the axis defined by stub shafts 62 and 63. As best seen in FIG. 4, the web 61 has opposite concave faces 65 smoothly merging with interior surfaces 66 of walls 60 and is faired or tapered at its ends at 67 for minimizing interference with flow of fluid passing through valve member through openings 68 when the valve member is in open position. The openings 68 are further defined by relatively thick metal sections 69 which are disposed transverse to the axis of stub shafts 62 and 63 to provide sufficient metal for making a splined connection for splined inner ends 70 and 71 respectively of the stub shafts 62 and 63. In FIG. 3, it may be noted that the splined faces on metal sections 69 may be formed by a single broaching operation through the valve member and a broached opening 73 may be provided in the web 61.

Edge face 35 of the valve member 22 may be formed as a spherical sector of a sphere having a radius substantially equivalent to the radius of the internal surfaces of passageway 27. Edge face 35 may be provided with a circumferential groove 75, including a convexly curved side wall surface, spaced inwardly from the downstream face of disc wall 60. Sealing lip 33 contacts convex edge face 35 between groove 75 and the downstream face of wall 60 so that when the valve member is moved between open and closed position wherein half the valve member passes beneath the sealing lip 33 in a downstream direction and the other half in an upstream direction, the sealing lip 33 will be smoothly guided into its ultimate sealing position over the convex curved groove side wall surfaces and the edge face 35. If desired, such a groove 75 may be provided along the circumferential edge portion adjacent the upstream wall 60 so that the valve member may be reversed and used without designating an upstream or downstream side of the valve member.

It is important to note that while the spherical radius of edge face 35 on the valve member is substantially the same as the radius of the internal faces of the passageway 27, the internal radius of the internal edge of sealing lip 33 is somewhat less than the radius of the passageway 27 and edge face 35. A transverse plane passed through the sealing line of contact of sealing lip 33 with the edge face 35 would show such line of contact to be of a radius somewhat greater than the radius of the circle defining the downstream face of wall 60. These relationships are important because the valve member 22 with an axis V indicated as lying in a plane passing through the valve member midway between walls 60 lies in offset or eccentric relation to the axis S of the stub shafts 62 and 63. In this example the axis S is displaced upstream and sidewise from the axis V and at an angle not greater than approximately 45° as measured from a plane passing longitudinally through the passageway 27 and axis S. Thus when the valve member is turned 90° to open position from closed position in which the sealing lip 33 has tight and complete sealing contact with the edge face 35, the edge face 35 and the valve member will be shifted or displaced slightly upstream so that sealing lip 33 now lying transverse to edge face 35 is free from contact with the edge face 35. This relationship is best seen in FIG. 8.

The importance of this relationship of the seal means 32 with the valve member in open position will be more apparent when one considers that in valve open position a cryogenic fluid is passing through the valve passageway 27 and the sealing member 32 is immersed in a fluid having a temperature ranging to minus 450° F. or the like. The material of sealing member 32 which may preferably be a filled Teflon material will become virtually hard and rigid at such temperatures. In the event the sealing lip 33 was in contact with the edge face 35 in open position, indentations or impressions made by edges of face 35 at diametrically opposite areas on the sealing ring 32 would be formed and made temporarily permanent. Under such condition when the valve member was moved to closed position, two leakage zones would have been formed and such leakage would not be stopped until the Teflon material of the sealing ring 32 had returned to higher temperatures at which it became relatively flexible, compliant and resilient and returned to its original shape. Thus by offsetting the axis V of the valve member and the shaft axis S, by forming the edge face 35 of the valve member as a spherical sector, and by displacing the valve member slightly sidewardly forwardly or upstream, in this example, the sealing edge 33 of the seal member will be in proximate but spaced free relation from edge face 35 when the valve member is in open position.

Means for pivotally mounting the valve member 22 include the stub shafts 62 and 63 and the splined connections 70 and 71 with the valve member as previously described. Valve shafts 62 and 63 may be mounted in bearing means 77 provided in diametrically opposite bores 78 formed in the annulus 26. Since the bearing means for each stub shaft may be the same like reference numerals will be used in the description thereof.

Each stub shaft may be provided with an annular groove 79 carrying a metal retaining and shaft thrust ring 80. Inwardly of ring 80 may be provided a circular seal element 81 for sealing the outer end of the splined portion of the stub shaft. In this example each stub shaft may be received within a filled Teflon frustoconical bearing element 82 having an outer conical surface which corresponds with an internal conical surface 83 provided in the bore 78. The element 82 is retained under axial or thrust pressure for tight sealing engagement with the shaft and with adjacent surfaces of the bore by a pressure ring 84 and a plurality of circumferentially spaced pressure screws 85 carried by a collar 86 held in selected axial relation with respect to the shaft by a lock and sealing member 87 seated in an internal groove 88 provided on the internal surfaces of bore 78. A spacer block 90 provided with inner and outer circumferential grooves containing Teflon seal rings 91 and 92 and seated against a shoulder 93 may provide outer seal means for the stub shaft. Stub shaft 62 may terminate in an exterior end housing 94 which may be provided with a conduit connection at 95 for means (not shown) to determine the position of shaft 62. The spacer block 90 may also be provided with a vent port 96 which communicates with the space between the block 90 and the pressure support collar 86.

The seal means for stub shaft 63 is identical to that described above for stub shaft 62. Stub shaft 63, however, includes an extension 100 which projects into actuator means 24.

Actuator means 24 may be provided at the top of the valve body 26 and may extend transverse to the axis of the body 26. Actuator means 24 serves to turn the valve member 22 through 90° from closed to open position and vice versa. Actuator means 24 may be operated by suitable pressure fluid and may be controlled so as to cause relatively slow opening of the valve member; for example, an opening period of time may be about five seconds and a relatively rapid closing period of about 500 milliseconds.

The actuator means 24 may comprise a housing means 102 including horizontally split top and bottom center housing portions 103 and 104 and cylindrical end portions 105 each of the same construction. The center housing portions 103 and 104 may be secured together as by spaced stud bolts 106. A suitable recess 107 may be provided in portion 104 for receiving and connecting the spacer block 90, forming part of the shaft seal means for stub shaft 63 with the housing means. The portions 103 and 104 each contain a bearing means 108 adapted to rotatably mount the shaft extension 100. The top bearing means 108 may be retained in position by a bearing cap 109 provided with a seal ring 110 and retained by a stud screw 111 having threaded engagement with the top end of shaft extension 100.

Opposed faces of the housing portions 103 and 104 may be suitably milled and shaped to provide a pair of parallel longitudinally extending ways 113 and 114 adapted to slidably receive and mount an actuator plate member 115 of generally rectangular plan and of relatively heavy metal section. Plate 115 is provided with a central longitudinally extending slot 116 through which the shaft extension 100 extends. An opening 117 is provided centrally along one side wall of slot 116 for receiving a roller 118 carried at a yoke-like end of arm 119 having its opposite end fixedly connected to the shaft extension 100 as by a spline connection 120. Roller 118 is carried on pivot pin 121 and the edge of roller 118 has clearance from an arcuate face 122 formed in housing portions 103 and 104. The arcuate face 122 is formed on a radius having the shaft extension as its center and may be transversely concave as seen in FIG. 3.

The plate 115 may carry at each end a circular piston head 124 each being carried on a longitudinally extending boss 125 provided on plate 115. Each piston head 124 may comprise an outer piston wall 126, an inner piston wall 127, and a piston ring member 128 carried on outer circumferential faces of the piston walls 126 and 127. The piston head 124 is held in assembled relation with the plate 115 by a plurality of stud screws 130 threaded as at 131 in the end face of plate 115.

Suitable seals may be provided at 132 between the boss 125 and the inner piston wall 127, at 133 for sealing each stud screw 130, at 134 between the juncture of the inner faces of the ring 128 and piston walls 126 and 127, and at 135 between the circumferential end face of the ring 128 and the internal cylindrical surfaces 136 of the cylindrical end portions 105. It should be noted that piston wall 126 is slightly spaced as at 138 from piston wall 127 and is also provided with a port 139 for communication between space 138 and chamber 164.

It should also be noted that circumferential edge faces of the piston walls 126 and 127 are oppositely inclined to form a shallow V as at 140 and that the internal circumferential face of the piston ring member 128 is provided with a V-shape configuration to correspond to the V-shape 140.

Each cylindrical end portion 105 may comprise a cylindrical wall 150 having at its inner end a circumferential rib 151 for interlocking engagement with the housing portions 103 and 104. Adjacent its outer end, wall 150 may be provided with external threads for threaded engagement as at 152 with a cylinder head 153. The cylinder head 153 may be provided with an internal groove 154 carrying a seal ring 155 for sealing engagement with the outer end portion of wall 150. On end wall 156 of the cylinder head 153 may be provided an annular inwardly extending stop rib 157 against which a piston wall 126 may abut as at 158. End wall 156 may be provided with a threaded port 159 for a fitting 160 for connecting a fluid pressure line 161 thereto. A lock ring 162 may also be threaded on the external threads 152. Thus at opposite ends of the actuator housing means 102 are provided chambers 164 for suitable actuating pressure fluid such as air or liquid.

Operation of the actuator means 24 may be best understood from a consideration of FIG. 2. As pressure fluid is introduced to the left chamber 164 the piston head 124 will be driven to the right and will cause the plate 115 to move to the right. As plate 115 moves, the roller 118 is caused to follow the plate 115 and the linear motion of the plate 115 is translated through the roller 118 and arm 119 into turning or rotational movement of the shaft extension 100. The arm 119 will swing through a 90° arc as indicated in FIG. 2 and at such final position the right piston head 124 is in abutment against the stop rib 157 on the opposite piston cylinder head 153. It should be noted that as the right piston head 124 approaches the cylinder head wall 156, fluid in the right chamber 164 is evacuated through the pipe 161. However a certain amount of fluid pressure is existent in the progressively reduced volume of the chamber 164 and fluid under such pressure is limitedly communicated through port 139 in outer piston wall 126 to the space 138 between the piston walls. Upon contact of piston wall 126 with stop rib 157 piston wall 127 moves towards wall 126 tending to compress fluid in space 138 and effecting some fluid damping movement (dependent upon the characteristics of the fluid) of the piston head at that end of its stroke. After contact of piston wall 126 with stop rib 157 the frictional resistances at the contacts of the inclined circumferential edge faces of walls 126 and 127 with the piston ring member 128 coact with the ring-spring action of ring member 128 and cylinder surfaces 136 to frictionally absorb and dissipate energy and to produce a shock absorbing action which does not adversely influence the accuracy of final valve positioning in either open or closed position. Due to the V-configuration at 140 of the circumferential edge faces of piston walls 126 and 127, the moving together of said walls 126, 127 tends to impart as by a wedging action is radially directed force against the piston ring member 128 and causes the piston ring member 128 to also frictionally engage internal surfaces 136. Thus as the volume of the right chamber 164 is reduced to its minimum and as the piston head 124 reaches the end of stroke a primary frictional damping action is imparted to the piston head 124.

As the valve member 22 is turned between open and closed position by the actuator means 24 as above described, it will be readily apparent that the sealing lip 33 and the valve member 22 change their relative positions so that when the valve member 22 is in open position the sealing lip will be out of contact with the edge face of the valve member as above described. In such open position the openings 68 provided in the valve member provide maximum fluid flow through the passageway 27 so that pressure drop through the valve means is reduced to a minimum. It will also be understood that in closed position of valve member 22 the beam type or girder type construction of the valve member will be subjected to substantial fluid pressure and in view of its beam-like construction, the valve member is capable of withstanding such pressure without substantial deflection as in bending. In view of the structural strength and rigidity of the valve member 22 it will be readily apparent that the transmission of such deflection and bending forces to the bearing means is also reduced to a minimum because of the splined stub shaft connections at relatively heavy metal sections of the valve member.

It should be noted that at the very low temperatures for which this valve means is designed to operate any contraction of the parts of the valve because of such low temperature will tend to increase the sealing effect at sealing lip 33 because as sealing lip 33 contracts it will be urged into tighter sealing engagement with the edge face 35 because of its dimensional change in response to decreasing temperatures or lower temperatures than those at which the valve was assembled with a preset sealing pressure. Similarly, the spring 47, because of its preset circumferential loading at the time of assembly, will respond to a decrease in temperature by contraction to assist and maintain a tight seal. Upon increase in temperature the ring 47 and the sealing ring will respond thereto by relieving sealing pressure until the preset sealing load is reached. Likewise the fluid pressure forces acting against the valve member 22 in a downstream direction which may result in any stresses or minute downstream displacement of the rigid valve member also tends to press the edge face 35 more tightly against the seal means 33. Thus the valve member 22 which has a high section modulus is capable of resisting loads due to fluid pressures of large magnitude and transfers such loads to the stud shafts while minimizing deflection of the valve disc because of these loads.

The construction of valve means 20 should be particularly noted with respect to the ease of assembly in a fluid pipe line such as 13 and 14 and also the ease of disassembly and ready access of the seal means for replacement or adjustment thereof if desired. Since the seal means is located on the downstream side of the valve member and with the valve member in close position it will be readily apparent that the pressure set screws 53 may be readily adjusted after pipe 14 is disconnected. The retaining ring 50 may be removed if desired and the support ring 42 may be then readily lifted away and out of the recess in the annular valve body member to replace the seal means 32 is necessary while the valve member is in closed position.

A modification of the construction of the valve member is shown in FIG. 9 in which a valve means embodying this invention is designed for use in installations where fluid pressures do not require a valve member of the beam or girder type construction described in the prior embodiment. In FIG. 9 the valve member 200 may comprise a single wall 201 spaced from the axis of rotation provided by the stub shafts 202 and 203. The valve wall 201 may be provided with diametrically opposed lug extensions 204 provided with openings 205 in which may be received inner ends 206 of stub shafts 202 and 203. Each shaft may be secured as by a pin 207. The ends of the lugs 204 remote from the wall 201 may be provided with a suitable outer curved face 208 having a diameter such that when the valve member 200 is rotated through 90° the face 208 will be free of contact with the seal means 209.

The seal means 209 may be of a different shape and configuration than that of the prior embodiment but it will be noted that it includes a sealing lip 210 biased radially inwardly against the sealing edge face 211 provided on the circumference of the valve wall 201. The seal means 209 may be formed of generally L or V section so disposed that the inner leg 212 of the seal means extends radially inwardly and axially. Thus while the general structure and shape of the seal means 209 is somewhat different than that shown in the prior embodiment its relation and function with respect to the valve member 200 is substantially the same as the prior embodiment.

In FIGS. 10 and 11 is illustrated a modification of the actuator means 24. A shaft extension 63' may be of substantially greater length than the stub shafts previously shown may be enclosed within an outer elongated cylindrical housing 220 having an internal chamber 221 in which any fluid escaping through seals between the stub shaft 63' and the housing 220 and the annular valve body member may vaporize to gas which may serve as a heat barrier and thus provide a vapor pressure chamber containing a relatively warm gas (instead of cryogenic fluid) and serving to assist in sealing stub shaft 63'. The shaft housing 220 may terminate in a top mounting flange 222 for the actuator means 24'.

The actuator means 24' operates in virtually the same manner as the prior embodiment and only those differences in structure and operation will be described. Actuator means 24' includes an actuator housing 102' which may be mounted on the flange 222 in suitable manner. The stub shaft 63' is provided a splined connection at 120' with a cam member or arm means 119' said arm means 119' comprising a central hub 224 and spaced top and bottom arm plates 225 interconnected thereby. The spaced plates 225 carry a pivot pin 121' for supporting a cam roller 118' therebetween. The cam roller 118' is contained within an opening 117' associated with elongated central slot 116' provided in a piston plate 115'. The slot 116' receives therewithin the extension of shaft 63' and plate 115' carries at its opposite ends piston heads 124' operable in piston chambers 164'. The extension of shaft 63' may be further projected upwardly beyond the splined connection at 120' to provide a connection with switch means (not shown).

The actuator means 24' is operable in similar manner to the prior embodiment and as the piston plate 115' moves to the left as viewed in FIG. 11 the roller 118' will translate such motion through the arm means 119' to the stub shaft extension 63' to cause rotation thereof.

It will be apparent to those skilled in the art that the actuator means of the last embodiment shown in FIGS. 10 and 11 provides means for developing a pressure in pressure chamber 221 for assisting in the seal of the stub shaft 63' and that such stub shaft may be readily turned in accordance with desired opening and closing requirements by the manner in which pressure fluid is introduced into the piston chambers 164' as in the prior embodiment. Such pressurized seal may also be employed in the prior embodiment.

It will be understood that various modifications and changes may be made in the valve means of this invention which comes within the spirit of the invention and all such changes and modifications coming within the scope of the appended claims are embraced thereby.

I claim:

1. A seal means for a valve means including a stationary valve body having a passageway for fluid and a movable valve member adapted to close said passageway, comprising: recess means in the valve body opening toward said passageway; a sealing ring member having L-shaped cross section providing a radially inwardly directed sealing portion extending into said passageway and an annular support portion for said sealing portion, said support and sealing portions being radially inwardly movable, and spring means carried by said valve body for applying radially inwardly directed pressure to said support portion above said sealing portion for urging said sealing portion toward said passageway, said spring means comprising a metal responsive to temperature decreases for thermally augmenting selected sealing pressure.

2. A seal means for a valve means including a stationary valve body having a passageway for fluid and a movable valve member adapted to close said passageway, comprising: recess means in the valve body; a sealing ring member having L-shaped cross section providing a radially inwardly extending sealing portion and an annular support portion for said sealing portion, said support portion and sealing portion being radially inwardly movable, and a spring means within said recess means exerting on said support portion a selected predetermined radially inwardly directed pressure at a normal temperature and having a contraction characteristic greater than the material of the valve member in decreasing temperature ranges for augmenting sealing pressure.

3. A seal means for cryogenic fluids responsive to selected physical and temperature conditions of fluid, comprising a body member; a recess means on said body; and seal means within the recess means comprising a sealing ring member having a radially extending sealing portion, a support section for said sealing portion angularly related to said sealing portion, and a temperature responsive biasing means in said recess means and cooperable with said support section for imparting a radially directed force to said sealing portion in response to changes in temperature.

4. A seal means responsive to physical and temperature changes in a fluid, comprising a body member providing an elongated passageway for fluid and having an annular recess means; and a sealing ring member of L-cross section within the recess means and including a sealing portion extending radially in to said passageway; and spring member bearing against said ring member adjacent to said sealing portion for imparting a radially directed seal force to said sealing portion, said spring member having a response to temperature changes for augmenting said radially directed seal force.

5. A seal means for a pair of body members arranged in coaxial concentric relation comprising a recess means on the outer concentrically arranged body member; and a seal means mounted in said recess means and having a radially inwardly extending sealing portion, said seal means including a radially outwardly and axially extending section, and a spring member bearing against said section for urging said sealing portion radially inwardly and thermally responsive to augment sealing pressures upon decrease in temperature.

6. A seal construction for cryogenic fluids and responsive to temperature changes comprising in combination a body member having an internal cylindrical surface; recess means on said body member; a seal means positioned within said recess means and comprising a non-metallic sealing member having a radially inwardly directed sealing portion having a bead-like sealing edge, and means coacting with said radially inwardly directed sealing portion to effect an augmented sealing pressure force and including a metallic thermally responsive ring member having pressure engagement with the sealing portion at locations radially outwardly of the said sealing edge to impart radially inwardly directed force components to said bead-like sealing edge, and a backing member having an annular portion supporting said sealing portion against axial displacement caused by fluid pressure against said sealing portion.

7. A temperature responsive seal construction comprising in combination: a body member provided with a passageway for fluid and having an axis; recess means in the body member facing said axis and passageway; a sealing member of non-metallic material within said recess means and having a sealing portion directed toward said axis in a plane normal to said axis; said sealing member having a section extending away from said sealing portion and providing a spring seating surface; a spring member seated on said seating surface and biasing said sealing portion toward said axis with a selected initial pressure and thermally responsive to changes in temperature to augment said sealing pressure; a backing member holding said sealing member in said recess means and supporting said sealing portion against axial movement; a retaining member carried by said body member in spaced relation to said backing member; and a plurality of pressure members mounted on said retaining member and having pressure engagement with said backing member for uniformly loading said backing member and sealing member.

8. A thermally responsive seal construction comprising in combination: a body member provided with a fluid passageway along an axis of said body member; recess means in said body member facing said axis; a sealing ring member in said recess including a generally L-section having a sealing portion of relatively thick section directed toward said axis in a plane normal to said axis; said L-section including a portion extending in the direction of said axis and providing a spring seating surface; an annular spring member seated on said seating surface and biasing said sealing portion toward said axis with a selected initial pressure and thermally responsive to changes in temperature to augment said sealing pressure; an L-shaped backing member supporting said sealing member and having an axially directed backing portion limiting axial movement of said sealing portion on the sealing member; a retaining ring carried by the body member; and pressure means carried by the retaining ring and having pressure engagement with the backing member for loading said backing member and sealing member.

9. A seal construction as stated in claim 8 wherein said spring seating surface is radially opposite said sealing portion.

References Cited by the Examiner

UNITED STATES PATENTS

| | | | |
|---|---|---|---|
| 1,488,296 | 3/1924 | Stevens | 251—174 |
| 1,489,857 | 4/1924 | Stevens | 251—174 |
| 2,680,592 | 6/1954 | Zierer | 251—305 |
| 2,892,609 | 6/1959 | Bibbo | 251—175 X |
| 2,893,682 | 7/1959 | Hintzman | 251—173 |
| 2,974,921 | 3/1961 | Kaswan | 251—306 X |
| 2,988,320 | 6/1961 | Kent | 251—174 |
| 3,013,769 | 12/1961 | Volpin | 251—174 |
| 3,049,335 | 8/1962 | Daumy | 251—305 |
| 3,077,902 | 2/1963 | Vickery | 251—174 X |
| 3,127,182 | 3/1964 | Wardleigh | 251—306 X |
| 3,144,040 | 8/1964 | White | 251—307 X |

FOREIGN PATENTS

| | | |
|---|---|---|
| 1,251,575 | 12/1960 | France. |
| 654,449 | 6/1951 | Great Britain. |
| 697,113 | 10/1953 | Great Britain. |
| 903,802 | 8/1962 | Great Britain. |

ISADOR WEIL, *Primary Examiner.*

CLARENCE GORDON, *Examiner.*